Jan. 12, 1943.  A. R. MISKIN  2,308,193
EARTH SCRAPER
Filed Dec. 6, 1939　　2 Sheets-Sheet 1

Inventor
Arthur R. Miskin,
By B. B. Collings
Attorney

Jan. 12, 1943.  A. R. MISKIN  2,308,193
EARTH SCRAPER
Filed Dec. 6, 1939  2 Sheets-Sheet 2

Inventor
Arthur R. Miskin,
By B. B. Collings.
Attorney

Patented Jan. 12, 1943

2,308,193

UNITED STATES PATENT OFFICE 2,308,193

EARTH SCRAPER

Arthur R. Miskin, Ucon, Idaho

Application December 6, 1939, Serial No. 307,896

7 Claims. (Cl. 37—134)

The invention relates to earth scrapers, especially those of the type shown in my prior U. S. Patents No. 1,269,484, granted June 11, 1918; No. 1,352,301, granted September 7, 1920; and No. 1,427,693, granted August 29, 1922, and has for one of its principal objects to improve certain of the constructions shown therein. Although certain of the improved features are equally applicable to scrapers of both the horse drawn and the tractor drawn types, the invention pertains more particularly to the tractor drawn form of scraper disclosed in the last mentioned of the said patents, No. 1,427,693, in that it provides improved means whereby the operator may completely control the functioning of the scraper from his position or seat upon the tractor vehicle.

With the above and other objects in view, which will appear as the description proceeds, the invention consists in the novel details of construction and combinations and arrangements of parts more fully hereinafter described and particularly pointed out in the appended claims.

Referring to the accompanying drawings forming a part of this specification, in which like reference characters designate like parts in all the views—

Figure 1:
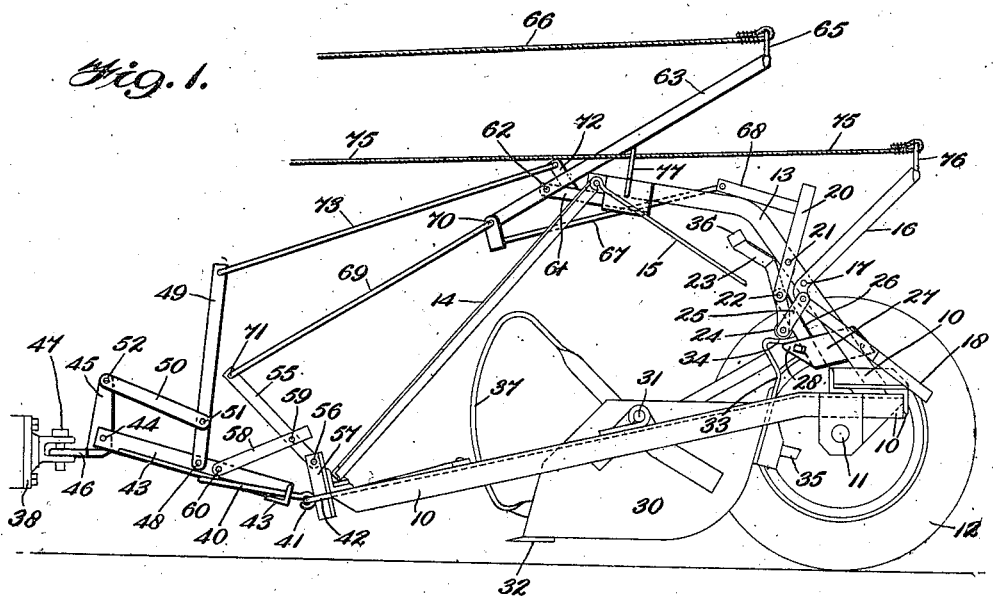
Figure 1 is a side elevational view of a scraper of the general construction of the said prior patents but equipped with the present improved control instrumentalities, the near wheel being omitted for the sake of clearness, and the parts being shown in the positions they occupy previous to the beginning of a scraping operation.

The construction of the scraper as here shown is in general similar to that of my above mentioned patents, comprising a substantially rectangular frame 10 which is supported at one end by stub axles 11 and wheels 12 for movement over the ground. A rear post or standard 13 is rigidly secured at its lower end to the medial rear portion of the frame 10, and extends upwardly and forwardly therefrom, with its forward end being braced in both a longitudinal and a transverse direction by a pair of forward brace members 14 and a pair of rearward brace members 15. These respective pairs of brace members are arranged in substantially inverted V form, with their lower ends secured to the frame 10 at approximately its four corners.

Figure 2:
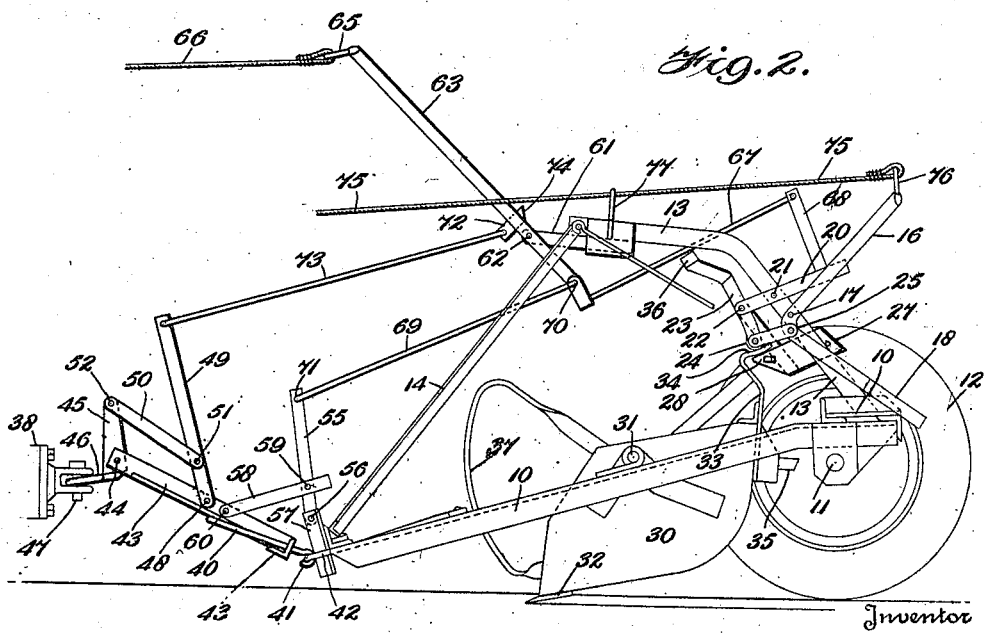
Fig. 2 is a view similar to Fig. 1, but illustrating the parts in the positions they assume during a scraping operation.
Figure 3:
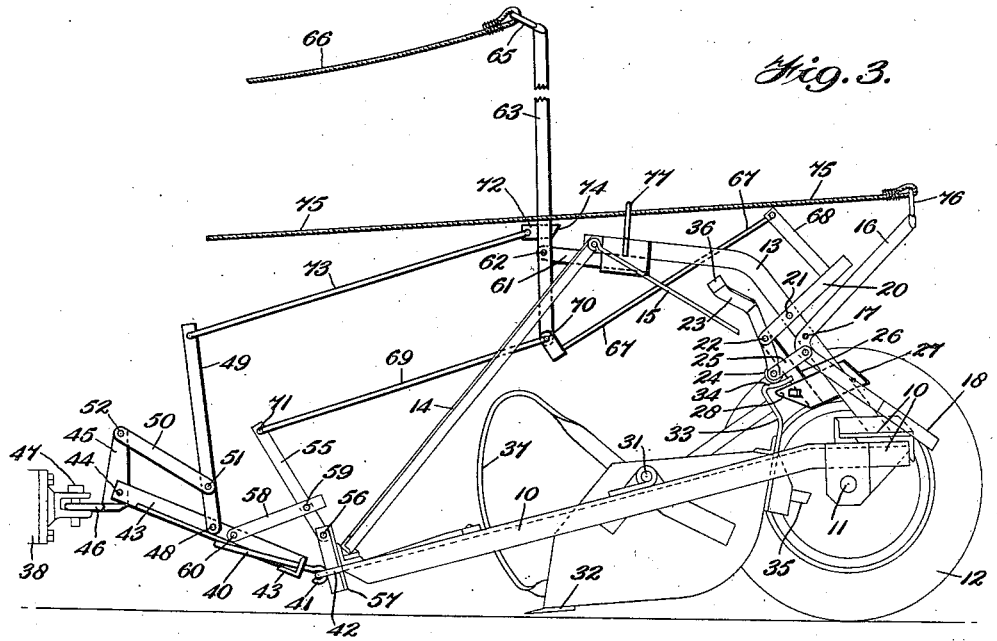
Fig. 3 is a similar view showing the parts in the positions to which they are moved for transport of the scraped earth to the place of deposit.

A dumping lever 16 of substantially L shape is pivotally secured as at 17 to the back post 13, the lower arm of the said lever being weighted as at 18, whereby its normal tendency is to occupy the position shown in Figs. 1, 2 and 3. A second L-shaped lever 20 is pivotally mounted intermediate the ends of one of its arms as at 21 to the back post 13, with the lower end of such arm pivotally mounting as at 22 a trigger catch 23, the lower end of which carries a roller 24, and is connected by a link 25 to the dumping lever 16. The said trigger catch 23 also has pivotally secured to it at the point 22 the upright leg 26 of an approximately L-shaped under-catch 27 having a nose 28 which normally underlies the roller 24 in slightly spaced relation thereto.

A scoop or pan 30, constituting the scraping and earth-carrying element of the machine, is pivotally mounted on the frame 10 by trunnions 31, and its lower forward edge may be provided with the renewable cutting or scraping member 32. The rear wall of the pan 30 carries a catch member 33 having an angularly disposed portion 34 which normally lies in the space between the roller 24 and the nose 28 of the undercatch 27, with the said roller resisting upward movement of the catch member 33 and consequent swinging of the pan on its trunnions 31 in a counter-clockwise direction, as viewed in the several figures of the drawings, while the nose 28 prevents movements in an opposite direction.

Figure 4:
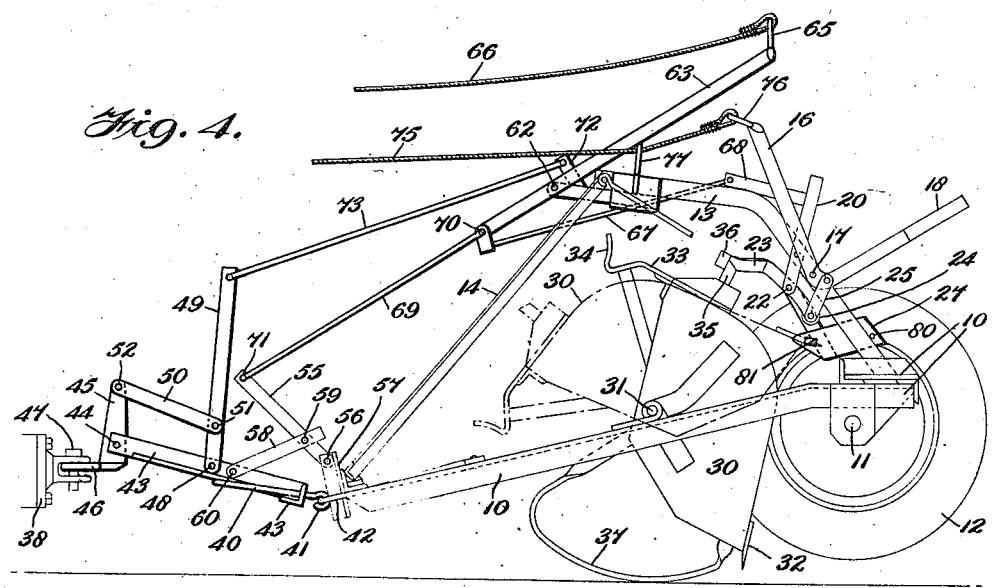
Fig. 4 is a similar view showing the parts in the discharging positions.

The said rear wall of the pan also carries a second catch member 35 which, in the spreading position of the pan illustrated in Fig. 4, engages with an extension 36 of the trigger catch 23 to temporarily retain the pan in said spreading position. During such spreading operation the pan is supported by a pair of curved shoes or runners 37 extending from the forward or open end of the pan and secured one to each side wall of the latter.

Except for the braces 14 and 15, and the under-catch 27, the construction thus far described is or may be essentially the same as that disclosed in my said prior Patent No. 1,427,693. As in that patent, the scraper here illustrated is intended to be drawn by a tractor or other motor propelled traction vehicle, the draw bar of which is here indicated more or less diagrammatically at 38. The means for connecting the scraper frame 10 to the draw bar 38, in the present invention, is modified somewhat from that disclosed in my said prior patent, and comprises a tongue structure which includes a V-shaped bail 40, the ends of which are provided with hooks 41 which are received in eyes 42 carried by the frame 10, thereby providing a pivotal connection between these parts. A substantially T-shaped tongue member 43, here shown as of angle iron construction, is rigidly secured to the bail 40, and its forward end is pivotally connected as at 44 to a lifting arm 45, which arm is provided with a rigid angularly extending eye 46 adapted to receive the pin 47 by means of which it may be connected to the draw bar 38. The tongue member 43 has pivotally secured to it as at 48 an upwardly extending lever 49, and a link 50 is pivotally secured to the said lever as at 51, and to the upper end of the arm 45 as at 52.

As in my former patent, means are provided for varying the angular relationship of the frame 10 to the bail 40 about the pivotal connection 41 between the two, whereby the said frame may be raised from and lowered toward the ground during various operations of the machine. These means comprise the lever 55 pivotally connected as at 56 to a frame member 57, there being a link 58 pivotally connected as at 59 to the said lever 55, and as at 60 to the tongue member 43.

The forward end of the standard 13 is provided with an extension 61, to which is pivotally secured as at 62 a filling or operating lever 63, the upper end of which is provided with an eye 65 to which is connected a rope or cable 66 extending forwardly to the operator's position upon the tractor. The lower end of the filling lever 63 is connected by a rod or link 67 to the arm 68 of lever 20, and also by a rod or link 69 to the upper end of the lever 55, which rod 69 is pivotally connected as at 70 and 71 respectively to the said levers 63 and 55. The lever 63 carries a rigid angularly projecting lug 72 which is connected by a rod or link 73 to the upper end of the lever 49, and the lower end 74 of the said lug is arranged to engage the upper surface of the back post extension 61 when the parts are in the positions illustrated in Figs. 1 and 4. The parts are so proportioned and arranged that in these positions the pivots 62, 70 and 71 are on dead center, or perhaps slightly past dead center, to constitute a toggle lock, and the engagement of the end 74 of the lug 72 with the standard 13 prevents the breaking of the toggle in one direction.

A rope or cable 75 is connected to an eye 76 on the lever 16, and extends forwardly through a guiding eye 77, carried by the standard 13 or extension 61 thereof, to the operator's position on the tractor.

The operation of the mechanism above described is as follows:

Starting with the parts in the positions as illustrated in Figure 1, which are those in which the scraper will approach the earth to be moved, it will be noted that as in my said prior patents the forward end of the frame 10 is raised somewhat above the surface of the ground and that the pan or receptacle 30 is likewise elevated so that the scraping blade 32 is positioned appreciably above the said surface. The frame is maintained in this position by the link 58 and lever 55 which control the angularity between the said frame and the tongue structure 40 while the receptacle 30 is maintained in its position by the trigger catch 23 and its controlling mechanism including the lever 20. Since the lever 20 is connected to the operating lever 63 by the link 67 and since the lever 55 is likewise connected to the said operating lever by the link 69, and since as above explained the pivots 62, 70 and 71 are in substantial alinement to afford a toggle lock, the relative positions of the frame and tongue and of the receptacle as shown in Figure 1 will be maintained so long as the operating lever 63 is not disturbed from the position shown.

However when it is desired to effect filling of the receptacle 30 with earth the operator from his position upon the tractor pulls upon the rope 66 to swing the operating lever 63 in a counterclockwise direction, the first effect of which is to break the toggle. The center of gravity of the machine lies somewhere between the planes of the supporting axle 11 and the support afforded by the tractor draw bar for the eye 46 of arm 45 and there is therefore of course a constant tendency toward articulation between the frame 10 and the tongue structure 40 at the pivot point 41. This tendency is restrained so long as the toggle lock afforded by alinement of the pivots 62, 70 and 71 is effective but as soon as this lock is broken through the above mentioned movement of the lever 63, the restraint is removed and the forward end of the frame tends to sink toward the ground as does also the rearward end of the tongue structure 40. This gravitationally influenced movement will be translated through the link 58, lever 55 and link 69 to the operating lever 63 causing it to swing to substantially the position illustrated in Figure 3, which movement will be communicated through the link 67 and lever 20 to the trigger catch 23 and under catch 27, the effect of which is to pivot the pan or receptacle 30 upon its trunnions 31, as was the case in my said prior patents. As a result the various parts will assume substantially the positions illustrated in Figure 3 with the forward end of the frame 10 appreciably closer to the surface of the ground than was the case in Figure 1 and with the blade 32 of the receptacle 30 resting upon or in close proximity to the ground surface.

In these positions the traverse of the machine will of course cause the blade 32 of the receptacle 30 to scrape up loose earth lying upon the surface of the ground and transfer it into the said receptacle. If the filling is not sufficiently rapid or if it be desired to cause the blade 32 to slightly penetrate the ground over which the machine is travelling the operator by a further pull upon the rope or cable 66 may move the lever 63 to substantially the position shown in Figure 2, which movement through the connections 67 and 69 and the levers 20 and 55 respectively will further tilt the pan 30 on its trunnions while at the same time it will further reduce the obtuseness of the angle between the frame 10 and tongue structure 40 thereby causing the scraper blade 32 to penetrate the ground as indicated in said Figure 2.

In addition to the movements just described whereby the frame 10 and receptacle 30 are lowered to either of the filling positions illustrated in Figures 2 and 3 it will be noted that movement of the operating lever 63 has through the link 73, lever 49 and link 50, produced a change in the relative angular positions of the tongue structure 40 and arm 45. This change is not so noticeable in Figure 3 but when the parts have reached the positions shown in Figure 2 the change in angularity of the tongue structure 40 and the arm 45 have become such that the said arm has been appreciably tilted relative to the support afforded by the tractor draw bar 38, the effect of which has been to slightly elevate the position of the pivotal connection 44 between the element 43 of the tongue structure and the said arm 45, which position will be maintained so long as the operator continues to pull on the rope or cable 66. However when the receptacle has been filled to the desired degree or when it is desired to have the blade 32 cease its penetration of the earth's surface, on release of the pull on cable 66, the arm 45 will tend to resume its Figure 1 or Figure 3 position which can only be accomplished through an increase in the obtuseness of the angularity between the said arm and the tongue member 43. This reversal of a relative movement between these two parts is transmitted through the link 50, lever 49 and link 73 back to the operating lever 63 tending to restore it to the Figure 3 position which movement of course, is translated through link 69, lever 55 and link 58 to simultaneously increase the obtuseness of the angle between the tongue structure 40 and the frame 10 and through the link 67, lever 20 and trigger catch 23 to the receptacle 30, the combined effect of which is to restore the parts to the Figure 3 positions thereby withdrawing the blade 32 from the earth as will be readily understood. So long as there is no further pull upon the cable 66 the parts will remain in these positions and the load may be transported to such point as it may be desired to discharge it.

When such point is reached the operator from his position upon the tractor then pulls upon the rope or cable 75 to swing the L-shaped lever 16 about its pivot 17 to the position shown in Fig. 4. The action of this lever is substantially the same as in my above mentioned prior patents, in that its movement is communicated by means of a link 25 to the lower end of the trigger catch 23 causing the latter to pivot about the pin 22 and to move from substantially the position shown in Fig. 3 to that illustrated in Fig. 4. The effect of this movement is to withdraw the roller 24 from its position above the extension 34 of member 33 permitting the pan 30 to pivot in a counterclockwise direction until its catch member 35 engages the extension 36 of the trigger catch 23, as shown in full lines in Fig. 4. During this movement the runners 37 of the pan are brought into engagement with the ground and not only serve to support the pan, but tend to slightly raise the rear end of the frame 10 and to perhaps completely lift the wheels 12 out of contact with the ground, as is illustrated in somewhat exaggerated form in Fig. 4. The effect of this lifting of the frame 10 is to tend to further straighten out the frame in relation to the tongue member 43, which movement will be communicated through the link 58 and lever 55 to the link or rod 69 and in turn to the lower end of lever 63 causing the latter to be snapped from its intermediate position shown in Fig. 3 back to its initial position shown in Figs. 1 and 4. As it reaches this position the pivots 62, 70 and 71 are brought substantially into line, or perhaps a little past dead center, and the face 74 of the lug 72 contacts the upper surface of the extension 61 of the standard 13 thereby preventing the breaking of the toggle lock thus formed, except through again drawing upon the rope or cable 66.

With the pan in the full line position shown in Fig. 4, the contents will be discharged and spread in a relatively thin layer as a result of the retention of the cutting member 32 in a position slightly above the ground, as illustrated. This provides a spreading discharge of the pan contents, but should it be desired to discharge the contents of the pan in a heap, the operator will release the cable 75 as soon as the pan has been initially tripped, as above described, thereby permitting the weight 18 to return the lever 16 to its Fig. 3 position and withdrawing the extension 36 of the trigger catch 23 from the path of the catch member 35. If this be done the pan will continue to turn to substantially the broken line position illustrated in Fig. 4 and the pan contents will of course all be discharged in a heap, as will be readily understood. The pan is retained in this broken line position by engagement of the cutting member 32 with the roller 24 of the trigger catch, it being understood of course that the latter is in the position shown in Fig. 1, rather than that illustrated in Fig. 4, when the pan reaches the said broken line position of Fig. 4. In order to release the pan and permit it to return to its Fig. 1 position, the operator will again pull upon the rope or cable 75 to move the trigger catch back to its Fig. 4 position, causing disengagement of the roller 24 from the member 32 and upon again releasing the cable 75 the pin will continue its pivotal movement until it again assumes the Fig. 1 position. In this movement the extension 34 of the pan-carried member 33 will engage the inclined undersurface of the nose 28 of the undercatch 27 and cause the latter to swing toward the right, as seen in the several figures, about the pivot 22 until the extension 34 has cleared the said nose, whereupon the undercatch will return by gravity to its Fig. 1 position.

Figure 5:
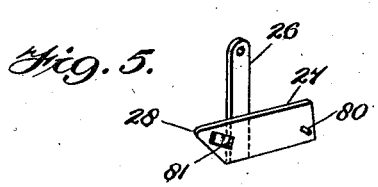
Fig. 5 is a detail perspective view of the improved under-catch for the scoop or pan, which may be used with either the horse or the tractor drawn type of scraper.

The approximately horizontal arm of the undercatch 27 extends rearwardly in proximity to a side face of the standard or back post 13, and is provided with a pin or projection 80, best shown in Fig. 5, which enages and rides upon the back face of the standard during the up and down movements of the under-catch, resulting from the operations of the lever 20 above described. When the under-catch 27 pivots on the pin 22 in response to contact of the extension 34 with the inclined undersurface of the nose 28 as the pan is returned to the Fig. 1 position, such pivotal movement is limited by a lug or projection 81 carried by the nose portion of the catch and arranged to contact the forward face of the standard 13, thereby insuring a quick return of the catch to its normal Fig. 1 position to prevent a rebound of the pan 30 as a result of the extension 34 forcibly striking the roller 24.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. In an earth scraper having a frame mounted for vertical movements toward and from the ground and for horizontal traverse thereover by draft means, a receptacle carried by said frame, a tongue member pivotally connected to the frame, and means for varying the angularity between the frame and tongue member to raise and lower the receptacle relative to the ground; a member pivotally connected to the tongue member for attachment to the draft means; and means for controlling the angular relationship between said tongue and attachment members.

2. In an earth scraper having a frame mounted for vertical movements toward and from the ground and for horizontal traverse thereover by draft means, a receptacle carried by the frame, a tongue structure articulated to the frame, and means for varying the angularity between the frame and tongue structure to raise and lower the receptacle relative to the ground; a member articulated to the tongue structure and attachable to the draft means; means for varying the angular relationship between said tongue structure and attachment member; and means for simultaneously actuating the two angularity-controlling means.

3. In an earth scraper having a frame mounted for vertical movements toward and from the ground and for horizontal traverse thereover by draft means, a receptacle carried by the frame, a tongue structure articulated to the frame, means for varying the angularity between the frame and tongue structure to raise and lower the receptacle relative to the ground, and means for actuating said angularity-controlling means; a member articulated to the tongue structure and attachable to the draft means; and means for increasing or decreasing the angular relationship between said tongue structure and attachment member simultaneously with an increase or decrease in the angularity between the frame and tongue structure.

4. In an earth scraper having a frame mounted for vertical movements toward and from the ground and for traverse thereover by draft means, a receptacle carried by the frame, a tongue structure pivotally connected to the frame, means for varying the angularity between the frame and tongue structure to raise and lower the receptacle relative to the ground, and means for actuating said angularity-controlling means; a member pivotally connected to the tongue structure and attachable to the draft means; means for varying the angular relationship between said tongue structure and attachment member; and connections between said last named angularity-controlling means and said actuating means whereby the angular relationship between the attachment member and tongue structure will be increased or decreased simultaneously with an increase or decrease respectively in the angular relationship between the tongue structure and frame and the connection between the tongue structure and attachment member will be raised or lowered as the connection between the tongue structure and frame is lowered or raised respectively.

5. In an earth scraper having a frame mounted for vertical movements toward and from the ground and for traverse thereover by draft means, a receptacle carried by the frame, a tongue structure pivotally connected to the frame, and means including an operating lever mounted on the frame for varying the angular relationship between the tongue structure and frame to raise and lower the receptacle relative to the ground; an arm pivotally connected to the tongue structure for attachment to and support by the draft means; means for controlling the angular relationship between the tongue structure and attachment arm, comprising a lever carried by the tongue structure and a link connecting said lever and arm; and connections between said last named and operating levers, whereby the two angularity-controlling means will operate in unison to simultaneously increase or decrease the angularities between the arm and tongue structure and the tongue structure and frame.

6. A wheeled earth scraper comprising a frame arranged for movements toward and from the ground; a scoop pivotally mounted on said frame; a standard carried by said frame; means mounted on said standard for controlling the pivotal movements of said scoop; a draft tongue structure pivotally connected to said frame; means connected to the frame and to said tongue structure for controlling the angular relationship between the two, an operating lever mounted on said standard; connections between said lever and said scoop controlling means, whereby movements of the lever may cause pivotal movements of the scoop; and additional connections between said lever and said tongue and frame controlling means, whereby said lever movements may coincide with changes in the angular relationship of the tongue structure and frame; said last named connections being arranged to coact with the lever in one position of the latter to effect a toggle lock for retaining the scoop and frame in a raised position.

7. A wheeled earth scraper comprising a frame arranged for movements toward and from the ground; a scoop pivotally mounted on said frame; a standard carried by said frame; means mounted on said standard for controlling the pivotal movements of said scoop; a draft tongue structure pivotally connected to said frame; means connected to the frame and to said tongue structure for controlling the angular relationship between the two; an operating lever mounted on said standard; connections between said lever and said scoop controlling means, whereby movements of the lever may cause pivotal movements of the scoop; and additional connections between said lever and said tongue and frame controlling means, whereby said lever movements may coincide with changes in the angular relationship of the tongue structure and frame; said last named connections being arranged to coact with the lever in one position of the latter to effect a toggle lock for retaining the scoop and frame in a raised position, and said operating lever having a portion engageable with the standard to prevent breaking of the toggle in one direction.

ARTHUR R. MISKIN.